(12) United States Patent
Dornburg et al.

(10) Patent No.: US 8,171,884 B2
(45) Date of Patent: May 8, 2012

(54) METHOD AND SYSTEM FOR FEEDING AQUATIC ANIMALS

(76) Inventors: Blake L. Dornburg, New Braunfels, TX (US); Curtis B. Schoettle, San Marcos, TX (US)

( * ) Notice: Subject to any disclaimer, the term of this patent is extended or adjusted under 35 U.S.C. 154(b) by 277 days.

(21) Appl. No.: 12/437,979

(22) Filed: May 8, 2009

(65) Prior Publication Data

US 2009/0277391 A1 Nov. 12, 2009

Related U.S. Application Data

(60) Provisional application No. 61/051,429, filed on May 8, 2008.

(51) Int. Cl.
*A01K 61/02* (2006.01)

(52) U.S. Cl. ................... 119/51.04; 119/51.11

(58) Field of Classification Search ............... 119/51.04, 119/51.11, 51.15, 57.92, 51.01, 51.02, 72; 43/100, 107; *A01K 61/02*
See application file for complete search history.

(56) References Cited

U.S. PATENT DOCUMENTS

| | | | |
|---|---|---|---|
| 2,800,256 A * | 7/1957 | Di Nuzzo | 222/333 |
| 3,716,172 A * | 2/1973 | Crippen | 222/453 |
| 3,971,341 A * | 7/1976 | Bron | 119/72 |
| 4,059,072 A | 11/1977 | Vassallo | |
| 4,185,587 A * | 1/1980 | Kallin | 119/51.11 |
| 4,235,198 A * | 11/1980 | Goguel | 119/51.04 |
| 4,279,220 A | 7/1981 | Kukurba | |
| 4,296,710 A | 10/1981 | Sillers | |
| 4,324,203 A | 4/1982 | Chiappetti | |
| 4,437,595 A | 3/1984 | Stevens | |
| 4,733,634 A | 3/1988 | Hooser | |
| 4,820,527 A * | 4/1989 | Christensen et al. | 426/2 |
| 4,949,674 A | 8/1990 | Young | |
| 4,972,802 A * | 11/1990 | Huddleston et al. | 119/51.04 |
| 5,003,925 A | 4/1991 | Roberts | |
| 5,037,018 A | 8/1991 | Matsuda | |
| 5,072,695 A | 12/1991 | Newton | |
| 5,113,796 A | 5/1992 | Matsuda | |
| 5,138,979 A | 8/1992 | Baird | |
| 5,140,943 A * | 8/1992 | Nearhoff | 119/51.04 |
| 5,154,547 A | 10/1992 | Young | |
| 5,299,529 A | 4/1994 | Ramirez | |
| 5,337,698 A | 8/1994 | Widmyer | |
| 5,483,923 A | 1/1996 | Sabbara | |
| 5,495,826 A * | 3/1996 | Lindbloom et al. | 119/75 |
| 5,794,560 A | 8/1998 | Terenzi | |
| 5,873,326 A | 2/1999 | Davet | |
| 6,009,835 A * | 1/2000 | Boschert | 119/51.04 |
| 6,082,299 A | 7/2000 | Halford | |
| 6,182,606 B1 | 2/2001 | Wells | |
| 6,314,910 B1 | 11/2001 | Tracy | |
| 6,401,657 B1 | 6/2002 | Krishnamurthy | |
| 6,427,628 B1 | 8/2002 | Reece | |
| 6,452,871 B1 | 9/2002 | Sotelo | |
| 6,467,431 B1 | 10/2002 | Stietzel | |

(Continued)

*Primary Examiner* — Son T Nguyen
*Assistant Examiner* — Kathleen Iwasaki
(74) *Attorney, Agent, or Firm* — Mark E. Scott; Conley Rose, P.C.

(57) ABSTRACT

Method and system for feeding aquatic animals. At least some of the illustrative embodiments are methods including submerging, at least partially, a chamber in a water reservoir, the chamber comprising a bladder comprising food for aquatic animals, periodically pumping water from the water reservoir into the chamber, exterting, by the pumping, a force on the bladder, and thereby dispensing the food into the water reservoir.

4 Claims, 3 Drawing Sheets

U.S. PATENT DOCUMENTS

| | | |
|---|---|---|
| 6,487,987 B1 | 12/2002 | Choi |
| 6,622,655 B2 | 9/2003 | Springett |
| 6,694,917 B1 | 2/2004 | Wang |
| 6,715,442 B1 * | 4/2004 | Belloma .................... 119/51.04 |
| 6,758,163 B1 | 7/2004 | Sternitzky |
| 6,766,766 B1 | 7/2004 | Elliott |
| 6,779,486 B2 | 8/2004 | Vaags |
| 7,059,270 B1 | 6/2006 | Loginov |
| 7,152,363 B1 * | 12/2006 | Garcia-Cruz ................ 43/44.99 |
| 7,159,539 B2 | 1/2007 | Neckel |
| 7,174,849 B1 | 2/2007 | Hall |
| 7,219,620 B2 | 5/2007 | Rucker |
| 7,228,816 B2 | 6/2007 | Turner |
| 2005/0229864 A1 | 10/2005 | Willemsen |
| 2007/0014642 A1 | 1/2007 | Teodorescu |
| 2009/0255474 A1 * | 10/2009 | Gleesing .................... 119/51.04 |

* cited by examiner

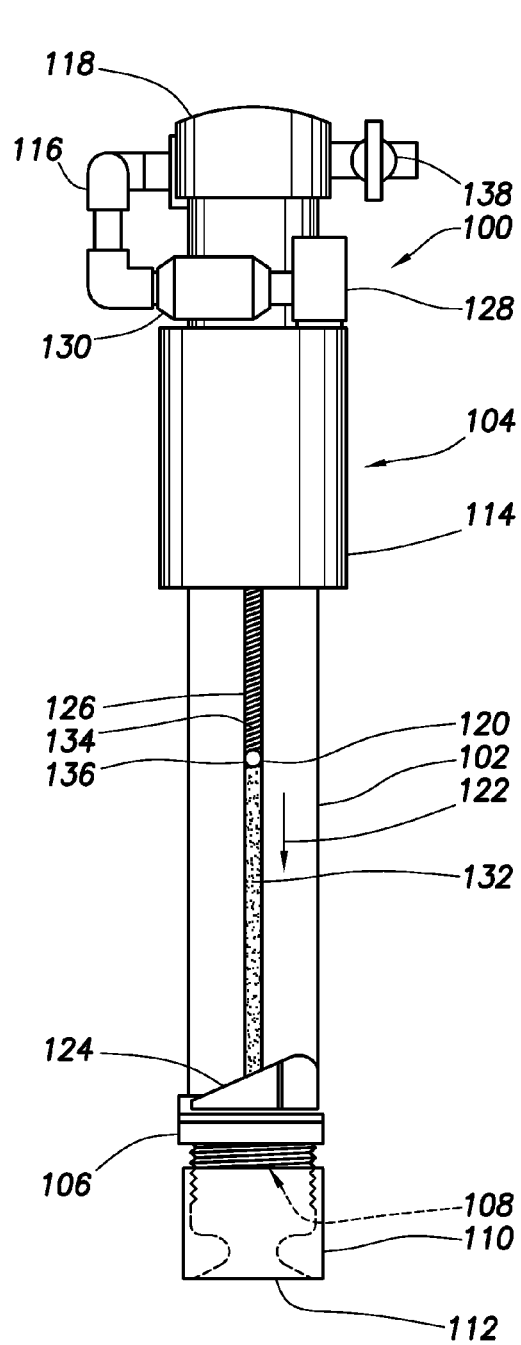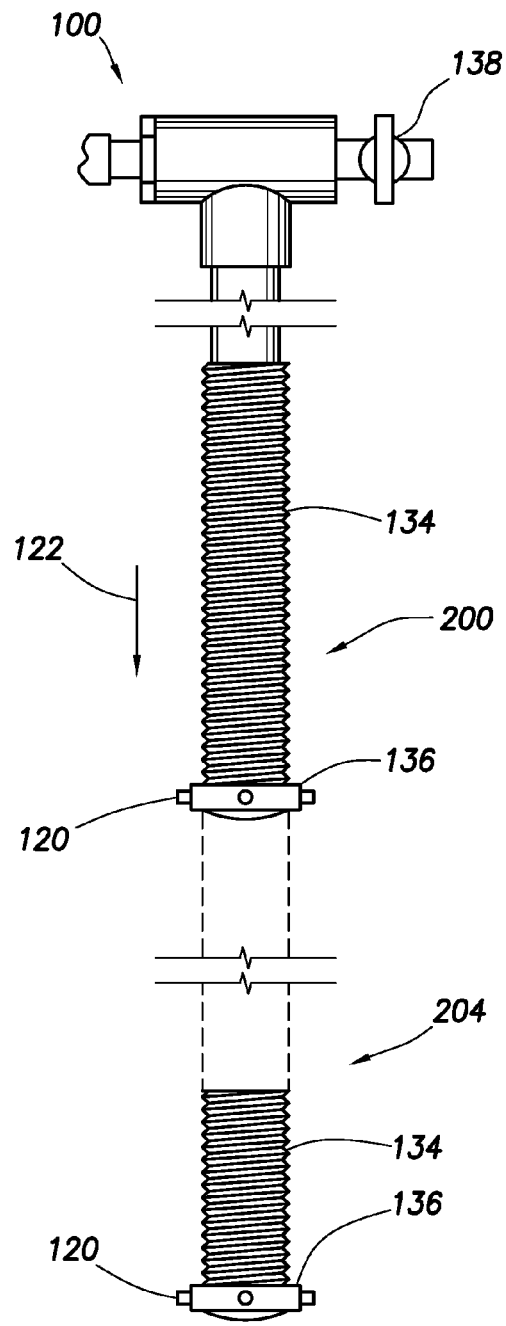
FIG.1B
FIG.2

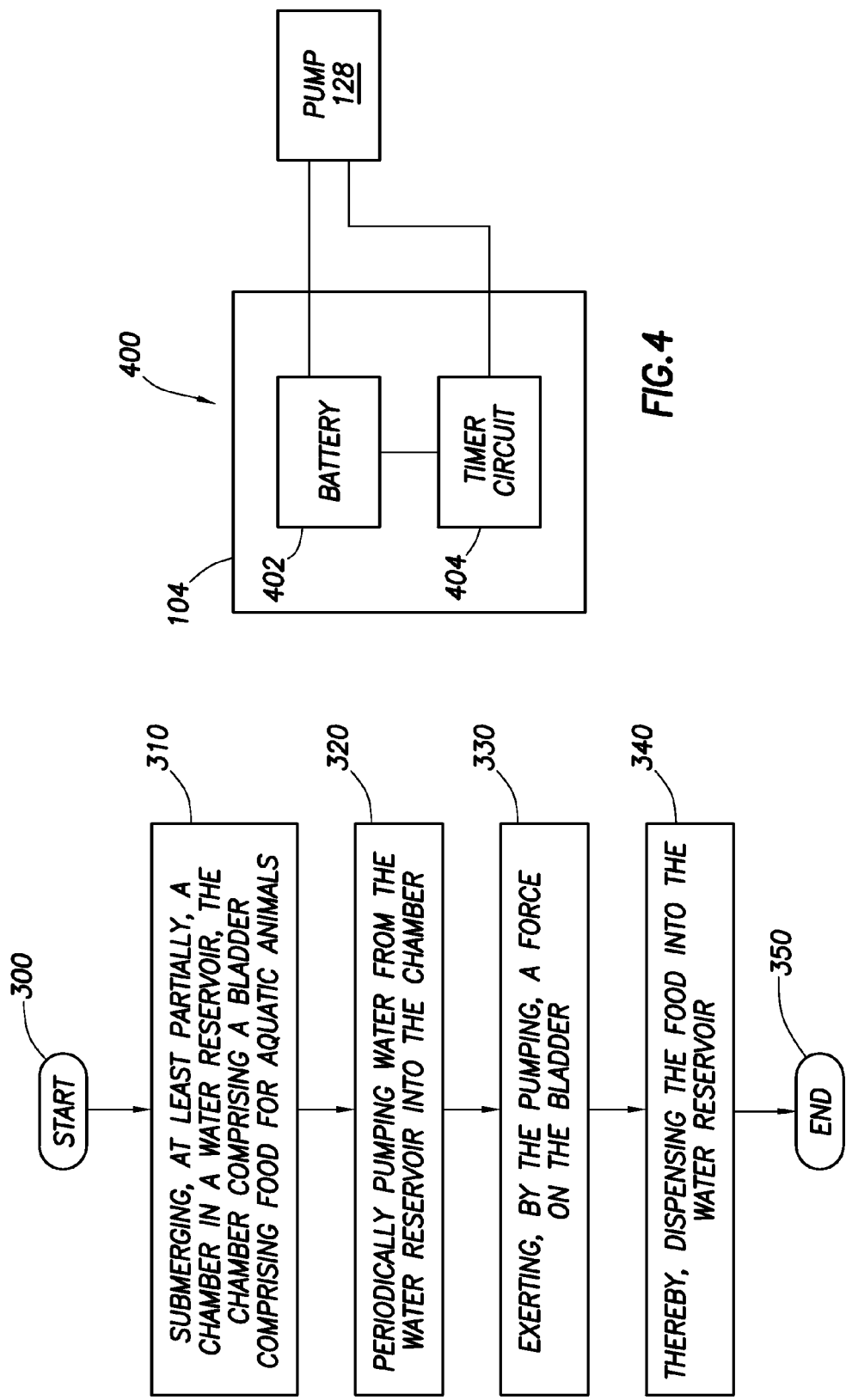

METHOD AND SYSTEM FOR FEEDING AQUATIC ANIMALS

BACKGROUND

In order to draw land mammals, such as deer, to a particular area, a land owner may install feeders that periodically release food for consumption (e.g., at the same time every day). These feeds may be operable for weeks at a time without human intervention. While the same technique can be used for aquatic animals, such as fish, a difficulty arises in placement. In particular, the public at large has access to the complete surface area of many lakes, and unless one happens live on a piece of property on a lake shore, a feeder device placed on a lake shore, or perhaps placed on a floating dock, is subject to being stolen or tampered with when the actual owner is not present.

BRIEF DESCRIPTION OF THE DRAWINGS

For a detailed description of exemplary embodiments, reference will now be made to the accompanying drawings in which:

FIG. 1B shows an alternative view of the feeding system in accordance with at least some of the embodiments;

FIG. 2 shows an elevation view of illustrative internal components of the feeding system in accordance with at least some of the embodiments;

FIG. 3 shows a method in accordance with at least some of the embodiments; and

FIG. 4 shows a control system in accordance with at least some of the embodiments.

NOTATION AND NOMENCLATURE

Figure 1A:
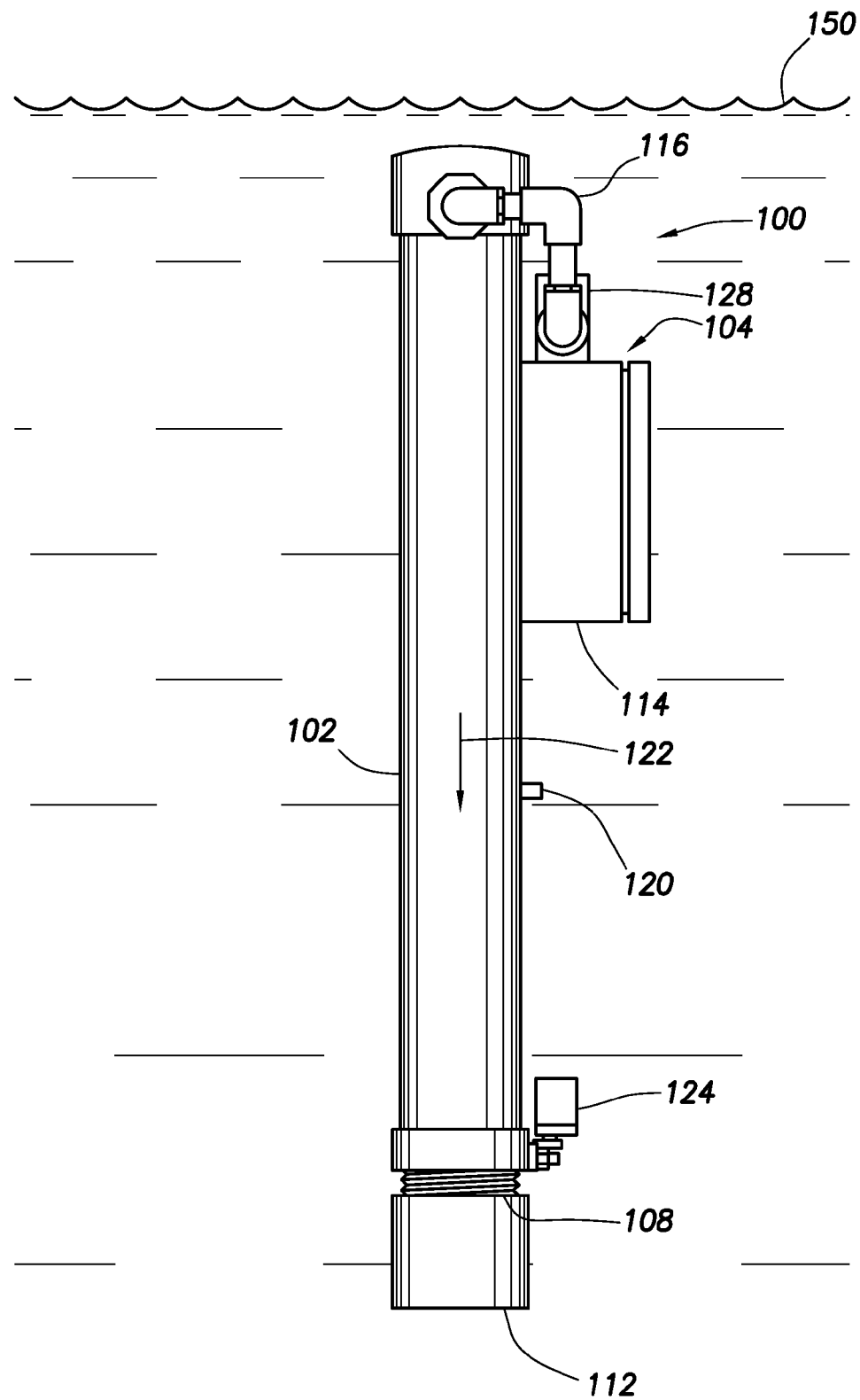
FIG. 1A shows a feeding system in accordance with at least some of the embodiments.

Certain terms are used throughout the following description and claims to refer to particular system components. As one skilled in the art will appreciate, outdoor product companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1A shows a side elevation view of an illustrative feeding system 100 in accordance with at least some of the embodiments. In particular, the feeding system 100 comprises an elongated member or chamber 102 and a control system 104 placed on the outside surface of the chamber 102. In the particular embodiment, the chamber 102 is of cylindrical shape and made of poly-vinyl chloride (PVC); however, the elongated chamber may be of any suitable shape and any suitable material. In at least some of the embodiments, food for aquatic animals (e.g., fish food in dry pellet form, fish food in moist form, baitfish, cheese, garlic, or shrimp) is placed within the chamber 102 and the entire feeding system 100, including the chamber 102 and the control system 104, is completely submerged in a water reservoir 150 (e.g., a lake, a creek, or an ocean). The feeding system 100 is submerged in the water reservoir 150 by various methods, for example, by hanging the feeding system 100 from a boat dock, or placing the feeding system 100 on a stand below the surface within the water reservoir 150. After submersing the feeding system 100 in the water reservoir 150, the feeding system 100 is configured to periodically dispense the food into the water reservoir 150, and the food dispensing tends to draw various types of fish to the feeding system 100.

In some embodiments, the control system 104 will activate a pump 128 to pump water from the water reservoir 150 through a pipe 116 into the chamber 102. As the pump draws water from the reservoir 150 and pumps the water into the chamber, the water causes a piston concentrically arranged inside the chamber 102 to move in the direction indicated by the arrow 122. The movement of the piston exerts a force on the food placed inside the chamber 102, which dispenses the food into the reservoir 150 through an opening 112 of the feeding system 100. The pump periodically pumps water into the chamber 102 (e.g., hourly, daily, weekly, monthly, or yearly), each time causing the piston to move further in the direction indicated by the arrow 122 until a pin 120 coupled to the piston contacts a stop switch 124. In the illustrative embodiment, the stop switch 124 is placed outside of the chamber 102 and proximate to the opening 108 of chamber 102, and when the pin 120 contacts the stop switch 124, the stop switch 124 is actuated to halt the further movement of the piston. Stated otherwise, when the pin 120 contacts the stop switch 124 most of the food has been dispensed and more food needs to be placed inside the chamber 102. The pin 120 and stop switch 124 is merely illustrative, and any mechanical, electromechanical or electrical system that detects position of the piston and halts or disables furthers piston movement may be equivalently used.

FIG. 1B shows a front elevation view of the feeding system 100 in accordance with at least some of the embodiments. In particular, the feeding system 100 again comprises the elongated chamber 102 and a control system 104. Also better visible in FIG. 1B are the pump 128, check valve 130, pressure release valve 138, bellows 134, and bladder filled with food for aquatic animals 132. In the particular embodiment, the chamber 102 has an opening 108 at a first end 106 that is configured to retain a nozzle or dispenser 110. In some embodiments, the dispenser 110 is threadingly coupled to the first end 106. In other embodiments, the dispenser 110 couples to the first end 106 by way of a snap-fit connection or other suitable connection. The dispenser 110 comprises an opening 112 at an end opposite the end that couples to the chamber 102, and the food in the chamber 102 is dispensed through the opening 112 of the dispenser 110. In the particular embodiment, the internal diameter of the opening 112 (e.g., 2 inches) of the dispenser 110 is substantially smaller than the internal diameter (e.g., 4 inches) of the chamber 102. For embodiments where the system 100 is submerged in the orientation shown in FIGS. 1A and 1B, the smaller opening of the dispenser 110 helps retain the food in the system 11 during periods of time when dispensing is not taking place. Larger openings in the dispenser 110 are contemplated, particular if the system 100 is submerged in a horizontal orientation. In either case, a screen or grating material covers the opening to keep larger fish from entering the opening and gaining access to the food.

In the particular embodiment of FIG. 1B, the chamber 102 also comprises a slit 126 through which the pin 120 protrudes. As discussed above, the pin 120 protrudes through the slit 126 and contacts the stop switch 124 on the outside of the chamber 102 when a predetermined amount of travel of the piston has taken place. In other embodiments, the pin 120 and the stop switch 124 are placed at any suitable location within the chamber 102. In the particular embodiment of FIG. 1B, the control system 104 is placed on the outside surface of the chamber 102, and the control system 104 comprises a watertight case 114 (e.g., a Pelican™ case). A battery and a timer circuit are disposed within the case 114, and the battery is electrically coupled to the timer circuit. The timer circuit is configured to control the timing of the feeding system 100. Stated otherwise, the timer circuit is configured to control how often and how long the feeding system 100 dispenses food into the water reservoir. The control system 104 is electrically coupled to a pump 128 (e.g., a submersible pump) that is coupled to the outside surface of the chamber 102. In the particular embodiment, the pump 128 is a direct current (DC) pump placed proximate to a second end 118 of the chamber 120 (i.e., the end opposite the end which couples to the dispenser 110); however, in other embodiments, the pump 128 may be placed at any location along the outer surface of the chamber 102.

Initially, in some embodiments, the dispenser 110 is removed from the opening 108 of chamber 102, and the chamber 102 is configured to receive food for aquatic animals. In particular, the piston (FIG. 2) is positioned at an initial or retracted position, and a bladder filled (e.g., an elongated plastic bag) with food 132 is placed inside the chamber 102 through and proximate the opening 108. Thereafter, the dispenser 110 is coupled to the opening 108 of the chamber 102. In other embodiments, depending on the consistency of the food, the food 132 may be placed directly inside the chamber 102 (i.e., without a bladder). A desired period for dispensing food is selected (e.g., hourly, daily, weekly, monthly or yearly) is set by way of the timer circuit, and a desired amount to dispense is selected (proportional to the length of activation of the pump). Thereafter, the feeding system 100 including the chamber 102 and the control system 104 is completely submerged (e.g., by hanging the feeding system 100 from a boat dock or a tree) in the water reservoir. In other embodiments, the control system 104 may be physically separated from the chamber 102 and only the chamber 102 is submerged into the water reservoir, yet still operationally coupled to the chamber 102 (e.g., the control system 104 is located at the surface, for example on the boat dock or on the tree).

Initially, as the feeding system 100 is submerging into the reservoir, water from the reservoir fills the chamber 102 by way of the opening 112 and at least one vent aperture at second end 118 of the chamber 102. After the chamber 102 has been submerged, the timer circuit at the set period initiates the pump 128 to draw water from the water reservoir and pump the water into the chamber 102. In particular, the timer circuit periodically activates the pump 128, and leaves the pump 128 activated for a predetermined period of time. The pump 128 draws water on a suction side of the pump, and pumps the water pumped into the chamber 102 via a check valve 130. The check valve 130 (e.g. ball check valve, swing check valve or clapper check valve) allows the water to flow only in one direction (i.e. allows water to only flow into the chamber 102). Water flow into the chamber 102 causes the piston to exert a force on the bladder filled with food 132, and the force in turn causes ejection or dispensing of food from bladder into the water through the opening in the 112 in the dispenser 110.

FIG. 2 shows various components within the chamber 102 in accordance with at least some embodiments. In the particular embodiment, the pump 128 is coupled (through the check valve 130 and pipe 116) to bellows 134. The bellows 134 are shown both in a retracted orientation 200, and an extended orientation 204. The bellows 134 are concentrically arranged inside the chamber 102 and the bellows may be of any suitable type, such as plastic bellows, or metallic bellows. In other embodiments, the bellows 134 is representative of any linear actuator (e.g., a mechanical actuator, or a hydraulic actuator). The representative bellows 134 are coupled to piston 136, and the piston 136 concentrically arranged inside the chamber 102. As the pump 128 pumps water into the bellows 134, the additional water in bellows 134 causes the bellows to expand axially, as shown by arrow 122. The axial movement of the bellows thus causes movement of the piston 136, also in the direction indicated by the arrow 122. As the bellows 134 extend axially because the increase water volume forced therein, the piston 136 exerts a force on the food in the bladder 132, which in turn dispenses the food into the water reservoir through the opening 112 (now shown in FIG. 1B). However, once pump 128 is deactivated, axial extension of the bellows 134 and piston 136 ceases. The bellows 134 do not retract axially when the pump 128 stops because the water within the bellows 134 cannot reverse flow through the check valve 130, and pressure release valve 138 is closed in normal operation.

In some embodiments, to refill the chamber 102 with food the feeding system 100 is removed from the water reservoir and the pressure release value 138 (e.g., a half port ball valve or a full port ball valve) is opened. Opening the pressure release valve 138 allows the water in the bellows 134 to flow out of the chamber 102 as the piston 136 is forced back to its initial position. In particular, as the piston 136 moves in the direction opposite the direction indicated by the arrow 122, the water in the bellows 134 flows out through the opened pressure release valve 138 thus returning the bellows 134 and the piston 136 their initial positions. Once the piston 136 is in the initial position, the pressure release valve 138 is again closed. In particular embodiments, the act of placing the bladder filled with food inside 132 the chamber 102 is the mechanism by which the piston 136 is forced back to its initial position. Thereafter, the feeding system 100 is again submerged into the water reservoir.

FIG. 3 shows a method in accordance with at least some of the embodiments. In particular, the method begins (block 300), and moves to submerging, at least partially, a chamber in a water reservoir (block 310). In some embodiments, the chamber comprises a bladder comprising food for aquatic animals. Thereafter, water is periodically pumped from the water reservoir into the chamber (block 320). Next, a force is exerted on the bladder by pumping of the water into the chamber (block 330). Finally, the food in bladder is dispensed into the reservoir due to the force exerted on the bladder (block 340), and the method ends (block 350).

FIG. 4 illustrates in greater detail a control system 400, which is illustrative of the control system 104 of the feeding system 100, such as may be placed in case 114. The control system 400 described with respect to FIG. 4 could be physically coupled to the chamber 102 of the feeding system 100, or the control system 400 could be physically located at the surface when the control system 400 is separate from the chamber 102. In any case, the control system is operatively coupled to the chamber 102. The illustrative control system 400 comprises a battery 402 (e.g., a 12 Volt battery) coupled to a timer circuit 404 and the pump 128. The battery 402 may be any single use or rechargeable battery or battery system. The battery 402 provides power to operate the timer circuit 404, and, through the timer circuit 404, the battery 402 provides power to the pump 128. In illustrative embodiments, the timer circuit 404 is configured to periodically initiate the pump 128 to pump water. In particular, the timer circuit 404 is configured to set a period (e.g., hourly, daily, weekly, monthly or yearly) for initiating the pump 128.

The above discussion is meant to be illustrative of the principles and various embodiments of the present invention. Numerous variations and modifications will become apparent to those skilled in the art once the above disclosure is fully appreciated. For example, while the feeding system 100 is submerged in a substantially vertical orientation in the various embodiments, the feeding system 100 may be submerged in any other orientation (e.g., horizontal or diagonal). Moreover, in alternative embodiments, the feeding system 100 is only partially submerged in the water reservoir (i.e., the feeding system 100 is submerged till the pump 128 is submerged in the reservoir). It is intended that the following claims be interpreted to embrace all such variations and modifications.

What is claimed is:

1. A system comprising:
   an elongated chamber at least partially submerged in a water reservoir;
   a bladder comprising food for aquatic animals disposed inside the chamber;
   a piston concentrically arranged inside the chamber, the piston exerting a force on the bladder which causes ejection of the food into the water reservoir through an opening in the chamber; and
   a control system coupled to the outside of the chamber, the control system configured to periodically initiate movement of the piston to exert the force, and the control system comprising: a pump coupled to the chamber, the pump configured to draw water from the water reservoir and pump water into the chamber which causes movement of the piston; and a bellows arranged inside the chamber, wherein a first end of the bellows fluidly coupled to the pump and a second end of the bellows coupled to the piston; and a watertight case; a battery within the case; and a timer circuit within the case coupled to the battery, the timer circuit configured to control the movement of the piston.

2. The system as defined in claim 1 further comprises a linear actuator coupled to the piston, the linear actuator causes the movement of the piston.

3. The system as defined in claim 1 further comprises a stop switch proximate to the opening, the stop switch configured to halt the movement of the piston.

4. The system of claim 1 wherein the piston contacts the bladder on a first end, and the food is ejected on a second end of the bladder, the second end opposite the first end.

* * * * *